(12) United States Patent
Sigler et al.

(10) Patent No.: US 10,675,703 B2
(45) Date of Patent: Jun. 9, 2020

(54) AL-STEEL WELD JOINT

(71) Applicant: GM GLOBAL TECHNOLOGY OPERATIONS LLC, Detroit, MI (US)

(72) Inventors: David Sigler, Shelby Township, MI (US); Blair Carlson, Ann Arbor, MI (US); Surender Maddela, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 579 days.

(21) Appl. No.: 15/478,684

(22) Filed: Apr. 4, 2017

(65) Prior Publication Data
US 2017/0291247 A1  Oct. 12, 2017

Related U.S. Application Data

(60) Provisional application No. 62/319,846, filed on Apr. 8, 2016.

(51) Int. Cl.
*B23K 11/20* (2006.01)
*B23K 11/11* (2006.01)
(Continued)

(52) U.S. Cl.
CPC ............. *B23K 11/20* (2013.01); *B23K 11/115* (2013.01); *B23K 11/185* (2013.01); *F16B 5/08* (2013.01); *B23K 2103/20* (2018.08)

(58) Field of Classification Search
CPC ..... B23K 11/185; B23K 11/11; B23K 11/115; B23K 11/20; B23K 9/232; B23K 2103/20
See application file for complete search history.

(56) References Cited

U.S. PATENT DOCUMENTS

| 3,038,988 A | * | 6/1962 | Kessler | B23K 11/20 219/91.2 |
| 5,302,797 A | | 4/1994 | Yasuyama et al. | |

(Continued)

FOREIGN PATENT DOCUMENTS

| CN | 1946506 | 4/2007 |
| CN | 101043968 A | 9/2007 |

(Continued)

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.

(Continued)

*Primary Examiner* — Michael P Ferguson
(74) *Attorney, Agent, or Firm* — Reising Ethington P.C.

(57) ABSTRACT

A weld joint is disclosed that weld bonds together an aluminum workpiece and a steel workpiece. The weld joint includes an aluminum weld nugget, an intermetallic layer, and an annular ring of aluminide particles that is selected from the group consisting of nickel aluminide particles, iron aluminide particles, and a combination thereof. The annular ring of aluminide particles extends upwards from a weld bond surface of the weld joint such that the annular ring of aluminide particles extends radially inwardly into the aluminum weld nugget and protects the weld bond surface of the weld joint against crack propagation that may originate from a notch root of the weld joint.

13 Claims, 5 Drawing Sheets

(51) Int. Cl.
   *B23K 11/18* (2006.01)
   *F16B 5/08* (2006.01)
   *B23K 103/20* (2006.01)

(56) References Cited

U.S. PATENT DOCUMENTS

| | | | |
|---|---|---|---|
| 5,304,769 | A | 4/1994 | Ikegami et al. |
| 5,783,794 | A | 7/1998 | Oikawa et al. |
| 6,037,559 | A | 3/2000 | Okabe et al. |
| 6,543,670 | B2 * | 4/2003 | Mahoney ............ B23K 20/1265 228/112.1 |
| 7,850,059 | B2 | 12/2010 | Kobayashi et al. |
| 7,935,908 | B2 | 5/2011 | Nakagawa et al. |
| 7,943,883 | B2 * | 5/2011 | Doira .................... B23K 9/232 219/118 |
| 7,951,465 | B2 | 5/2011 | Urushihara et al. |
| 7,984,840 | B2 | 7/2011 | Kobayashi et al. |
| 8,020,749 | B2 | 9/2011 | Kobayashi et al. |
| 8,058,584 | B2 | 11/2011 | Miyamoto et al. |
| 8,487,206 | B2 | 7/2013 | Urushihara et al. |
| 8,502,105 | B2 | 8/2013 | Tanaka et al. |
| 9,676,065 | B2 | 6/2017 | Sigler et al. |
| 2005/0218121 | A1 | 10/2005 | Hayashi et al. |
| 2005/0247679 | A1 | 11/2005 | Wang |
| 2007/0212565 | A1 | 9/2007 | Urushihara et al. |
| 2009/0255908 | A1 | 10/2009 | Sigler et al. |
| 2011/0097594 | A1 | 4/2011 | Tanaka et al. |
| 2012/0021240 | A1 | 1/2012 | Urushihara et al. |
| 2013/0189023 | A1 | 7/2013 | Spinella |
| 2013/0263638 | A1 | 10/2013 | Gugel et al. |
| 2014/0305912 | A1 | 10/2014 | Taniguchi et al. |
| 2014/0360986 | A1 | 12/2014 | Sigler et al. |
| 2015/0053654 | A1 | 2/2015 | Sigler et al. |
| 2015/0053655 | A1 | 2/2015 | Sigler et al. |
| 2015/0083693 | A1 | 3/2015 | Schroth et al. |
| 2015/0096961 | A1 | 4/2015 | Carlson et al. |
| 2015/0096962 | A1 | 4/2015 | Sigler et al. |
| 2015/0231729 | A1 | 8/2015 | Yang et al. |
| 2015/0231730 | A1 | 8/2015 | Sigler et al. |
| 2015/0352658 | A1 | 12/2015 | Yang et al. |
| 2015/0352659 | A1 | 12/2015 | Sigler et al. |
| 2016/0016252 | A1 | 1/2016 | Edwards, II |
| 2016/0158874 | A1 | 6/2016 | Wang et al. |
| 2016/0279732 | A1 | 9/2016 | Sigler et al. |
| 2016/0288242 | A1 | 10/2016 | Sigler et al. |
| 2016/0346865 | A1 | 12/2016 | Sigler et al. |
| 2017/0008118 | A1 | 1/2017 | Yang et al. |
| 2017/0106466 | A1 | 4/2017 | Sigler et al. |
| 2017/0157697 | A1 | 6/2017 | Yang et al. |
| 2017/0225262 | A1 | 8/2017 | Sigler et al. |
| 2017/0225263 | A1 | 8/2017 | Sigler et al. |
| 2017/0232548 | A1 | 8/2017 | Carlson et al. |
| 2017/0252853 | A1 | 9/2017 | Wang et al. |
| 2017/0282303 | A1 | 10/2017 | Wang et al. |
| 2017/0291246 | A1 | 10/2017 | Sigler et al. |
| 2017/0291248 | A1 | 10/2017 | Sigler et al. |
| 2017/0297134 | A1 | 10/2017 | Sigler et al. |
| 2017/0297135 | A1 | 10/2017 | Sigler et al. |
| 2017/0297136 | A1 | 10/2017 | Brown et al. |
| 2017/0297137 | A1 | 10/2017 | Perry et al. |
| 2017/0297138 | A1 | 10/2017 | Sigler et al. |
| 2017/0304925 | A1 | 10/2017 | Sigler et al. |
| 2017/0361392 | A1 | 12/2017 | Sigler et al. |

FOREIGN PATENT DOCUMENTS

| | | |
|---|---|---|
| CN | 102059439 | 5/2011 |
| CN | 102114574 | 7/2011 |
| JP | 11342477 | 12/1999 |
| JP | 2011224578 | 11/2011 |
| JP | 2012152787 A | 8/2012 |
| JP | 2013151017 | 8/2013 |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

English translation of CN 102059439 to Mazda Motor (published May 18, 2011).

English translation JP 2011224578 to Kobe Steel (published Nov. 10, 2011).

English translation of JP2013151017 to Mazda Motor (published Aug. 8, 2013).

Haselhuhn et al., U.S. Appl. No. 15/807,219 entitled "Electrode Weld Face Design," filed Nov. 8, 2017.

Sigler et al., U.S. Appl. No. 15/907,996 entitled "Improving Mechanical Performance of Al-Steel Weld Joints by Limiting Steel Sheet Deformation," filed Feb. 28, 2018.

Sigler et al., U.S. Appl. No. 15/920,784 entitled "Resistance Spot Welding Workpiece Stack-Ups Having a Steel Workpiece and an Aluminum Workpiece with a Steel Plate," filed Mar. 14, 2018.

Sigler et al., U.S. Appl. No. 15/976,163 entitled "Multi-Step Direct Welding of an Aluminum-Based Workpiece to a Steel Workpiece," filed May 10, 2018.

Yang et al., U.S. Appl. No. 15/992,748 entitled "Electrode for Resistance Spot Welding of Dissimilar Metals," filed May 30, 2018.

* cited by examiner

AL-STEEL WELD JOINT

CROSS-REFERENCE TO RELATED APPLICATION(S)

This application claims the benefit of U.S. Provisional Application No. 62/319,846 filed on Apr. 8, 2016. The entire contents of the aforementioned provisional application are incorporated herein by reference in its entirety.

TECHNICAL FIELD

The technical field of this disclosure relates generally to a weld joint that bonds an aluminum workpiece and a steel workpiece together within a weld zone.

INTRODUCTION

Resistance spot welding is a process used by a number of industries to join together two or more metal workpieces. The automotive industry, for example, often uses resistance spot welding to join together metal workpieces during the manufacture of vehicle structural frame members (e.g., body sides and cross members) and vehicle closure members (e.g., vehicle doors, hoods, trunk lids, and lift gates), among others. A number of spot welds are often formed at various points around a peripheral edge of the metal workpieces or some other bonding region to ensure the part is structurally sound. While spot welding has typically been practiced to join together certain similarly composed metal workpieces—such as steel-to-steel and aluminum-to-aluminum—the desire to incorporate lighter weight materials into a vehicle body structure has generated interest in joining steel workpieces to aluminum workpieces by resistance spot welding. The aforementioned desire to resistance spot weld such dissimilar metal workpieces is not unique to the automotive industry; indeed, it extends to other industries including the aviation, maritime, railway, and building construction industries.

Resistance spot welding relies on the resistance to the flow of electrical current through overlapping metal workpieces and across their faying interface(s) to generate heat. To carry out such a welding process, a set of opposed welding electrodes is pressed in facial alignment against opposite sides of the workpiece stack-up, which typically includes two or three metal workpieces arranged in a lapped configuration. Electrical current is then passed through the metal workpieces from one welding electrode to the other. Resistance to the flow of this electrical current generates heat within the metal workpieces and at their faying interface(s). When the workpiece stack-up includes an aluminum workpiece and an adjacent overlapping steel workpiece, the heat generated at the faying interface and within the bulk material of those dissimilar metal workpieces initiates and grows a molten aluminum weld pool within the aluminum workpiece. The molten aluminum weld pool wets the adjacent faying surface of the steel workpiece and, upon termination of the current flow, solidifies into a weld joint that weld bonds the two workpieces together.

In practice, however, spot welding an aluminum workpiece to a steel workpiece is challenging since a number of characteristics of those two metals can adversely affect the strength—most notably the peel and cross-tension strength—of the weld joint. For one, the aluminum workpiece usually contains a mechanically tough, electrically insulating, and self-healing refractory oxide surface layer. This oxide surface layer is typically comprised of aluminum oxide compounds, but may include other metal oxide compounds as well, including those of magnesium oxide when the aluminum workpiece is composed, for example, of a magnesium-containing aluminum alloy. As a result of its properties, the refractory oxide surface layer has a tendency to remain intact at the faying interface where it not only hinders the ability of the molten aluminum weld pool to wet the steel workpiece, but also provides a source of near-interface defects within the growing weld pool. Furthermore, the insulating nature of the oxide surface layer raises the electrical contact resistance of the aluminum workpiece—namely, at its faying surface and at its electrode contact point making it difficult to effectively control and concentrate heat within the aluminum workpiece.

Moreover, in many instances, residuals from the refractory surface oxide layer and an intermediate organic material layer—such as an uncured yet heat-curable adhesive, a sealer, a sound-proofing layer, etc.—that is present between the aluminum and steel workpieces at the faying interface can interact to form a more tenacious composite material. Specifically, it is believed that residual materials from the organic material layer—which may include carbon ash, filler particles (e.g., silica, rubber, etc.), and other derivative materials end up combining with a residual oxide film to form a composite residue film that is more resistant to mechanical break down and dispersion during current flow as compared to the original refractory oxide surface layer. The formation of a tougher composite residue film results in fragments of that film remaining grouped and compiled at and along the faying interface in a much more disruptive manner as compared to instances in which an intermediate organic material layer is not present between the aluminum and steel workpieces. For instance, the composite residue film may block the diffusion of iron into the molten aluminum weld pool, which can result in excessive thickening of the hard and brittle Fe—Al intermetallic layer. Additionally, the composite residue film may provide a ready crack path along the bonding interface of the weld joint and the steel workpiece. Each of these incidents can weaken the weld joint.

Apart from the challenges presented by the refractory oxide surface layer of the aluminum workpiece, whether in conjunction with the intermediate organic material layer or not, the aluminum workpiece and the steel workpiece possess different properties that can adversely affect the strength and properties of the weld joint. Specifically, aluminum has a relatively low melting point (~600° C.) and relatively low electrical and thermal resistivities, while steel has a relatively high melting point (~1500° C.) and relatively high electrical and thermal resistivities. As a consequence of these differences in material properties, most of the heat is generated within the steel workpiece during current flow such that a heat imbalance exists between the steel workpiece (higher temperature) and the aluminum workpiece (lower temperature). The combination of the heat imbalance created during current flow and the high thermal conductivity of the aluminum workpiece means that, immediately after the electrical current flow is terminated, a situation occurs where heat is not disseminated symmetrically from the weld zone. Instead, heat is conducted from the hotter steel workpiece through the aluminum workpiece towards the welding electrode on the other side of the aluminum workpiece, which creates a steep thermal gradient in that direction.

The development of a steep thermal gradient between the steel workpiece and the welding electrode on the other side of the aluminum workpiece is believed to weaken the resultant weld joint in several ways. First, because the steel workpiece retains heat for a longer duration than the aluminum workpiece after the flow of electrical current has terminated, the molten aluminum weld pool solidifies directionally, starting from the region proximate the colder welding electrode (often water cooled) associated with the aluminum workpiece and propagating towards the faying surface of the steel workpiece. A solidification front of this kind tends to sweep or drive defects—such as gas porosity, shrinkage voids, and micro-cracking—towards and along the bonding interface of the weld joint and the steel workpiece where oxide film residue defects or composite residue film defects are already present. Second, the sustained elevated temperature in the steel workpiece promotes the growth of a hard and brittle Fe—Al intermetallic layer within the weld joint and contiguous with the faying surface of the steel workpiece. Having a dispersion of weld defects together with excessive growth of the Fe—Al intermetallic layer at the bonding interface tends to reduce the peel and cross-tension strength of the weld joint.

In light of the aforementioned challenges, previous efforts to spot weld an aluminum workpiece and a steel workpiece have employed a weld schedule that specifies higher currents, longer weld times, or both (as compared to spot welding steel-to-steel), in order to try and obtain a reasonable weld bond area. Such efforts have been largely unsuccessful in a manufacturing setting and have a tendency to damage the welding electrodes. Given that previous spot welding efforts have not been particularly successful, mechanical fasteners including self-piercing rivets and flow-drill screws have predominantly been used instead. Mechanical fasteners, however, take longer to put in place and have high consumable costs compared to spot welding. They also add weight to the vehicle—weight that is avoided when joining is accomplished by way of spot welding—that offsets some of the weight savings attained through the use of an aluminum workpiece in the first place. Advancements in spot welding that would make it easier to join aluminum and steel workpieces would thus be a welcome addition to the art.

SUMMARY

A weld joint that bonds together an aluminum workpiece and a steel workpiece may, according to one embodiment of the present disclosure, include an aluminum weld nugget, an intermetallic layer, and an annular ring of aluminide particles. The aluminum weld nugget is contained within an aluminum workpiece and the intermetallic layer is located between the aluminum weld nugget and a faying surface of the steel workpiece. The intermetallic layer provides a weld bond surface of the weld joint that is adjacent to and bonded with the faying surface of the steel workpiece. The annular ring of aluminide particles extends upwards from the weld bond surface of the weld joint and radially inwardly into the aluminum weld nugget. The annular ring of aluminide particles may comprise at least one of nickel aluminide particles or iron aluminide particles.

The weld joint of the aforementioned embodiment may have additional features. For example, the annular ring of aluminide particles may comprise nickel aluminide particles and iron aluminide particles. As another example, the annular ring of aluminide particles may comprise at least one of nickel aluminide particles having 20 at % to 50 at % nickel or iron aluminide particles having 20 at % to 50 at % iron. Such particle may comprise at least one of $NiAl_3$ particles, $NiMnAl$ particles, $FeAl_3$ particles, $Fe_2Al_5$ particles, or FeMnAl particles.

Other characteristics of the weld joint may also be further defined. For instance, the aluminum weld nugget of the weld joint may taper radially inwardly as the aluminum weld nugget extends away from the weld bond surface of the weld joint. Additionally, the weld bond surface of the weld joint may have a surface area that ranges from $4\pi t$ to $20\pi t$, in which "t" is a thickness of the aluminum workpiece within a weld zone that contains the weld joint prior to formation of the weld joint. And in yet another example, the intermetallic layer may comprise iron-aluminum intermetallic compounds and may have a thickness across the weld bond surface of the weld joint that ranges from 1 µm to 5 µm.

A weld joint that bonds together an aluminum workpiece and a steel workpiece and that has a weld bond surface adjacent to and bonded with a faying surface of the steel workpiece may, according to another embodiment of the present disclosure, include an aluminum weld nugget, an intermetallic layer, and an annular ring of aluminide particles. The aluminum weld nugget is contained within the aluminum workpiece and tapers radially inwardly as the aluminum weld nugget extends away from the weld bond surface of aluminum workpiece. The intermetallic layer is located between the aluminum weld nugget and the faying surface of the steel workpiece and, accordingly, provides the weld bond surface of the weld joint. The intermetallic layer may comprise iron-aluminum intermetallic compounds. The annular ring of aluminide particles extends upwards from the weld bond surface of the weld joint and radially inwardly into the aluminum weld nugget from a notch root that surrounds the weld joint at a faying interface of the aluminum and steel workpieces. The annular ring of aluminide particles comprises at least one of nickel aluminide particles or iron aluminide particles.

The weld joint of the aforementioned embodiment may have additional features. For example, the annular ring of aluminide particles may comprise at least one of nickel aluminide particles having 20 at % to 50 at % nickel or iron aluminide particles having 20 at % to 50 at % iron. As another example, the annular ring may comprise at least one of $NiAl_3$ particles, $NiMnAl$ particles, $FeAl_3$ particles, $Fe_2Al_5$ particles, or FeMnAl particles. Still further, the aluminum workpiece may include a base aluminum substrate composed of an aluminum alloy that includes at least 85 wt % aluminum. And in yet another example, the intermetallic layer that comprises iron-aluminum intermetallic compounds may have a thickness across the weld bond surface of the weld joint that ranges from 1 µm to 5 µm.

DETAILED DESCRIPTION

Spot welding an aluminum workpiece to a steel workpiece presents some notable challenges. In fact, as discussed above, several of the identified challenges that complicate the ability to spot weld those dissimilar metals relate to the susceptibility of the weld joint to being compromised at the interface of the joint and the faying surface of the steel workpiece by weld disparities, such as porosity and residual oxide fragments, and the presence of a hard and brittle intermetallic layer. These challenges are particularly problematic when an intermediate organic material is present between the two workpieces at the faying interface because the organic material can interact with a residual oxide film to form a more mechanically tough composite residue film. A weld joint 10 is disclosed here that counteracts at least some of the accumulation of weld joint disparities at and along a bonding interface of the weld joint 10 and the steel workpiece and, additionally, protects the bonding interface from crack propagation under an applied load. The afforded protection against crack propagation is noteworthy since oftentimes the primary cause of interfacial joint failure under an applied load is rapid crack growth through the intermetallic layer as aided by near-interface weld disparities.

Figure 1:
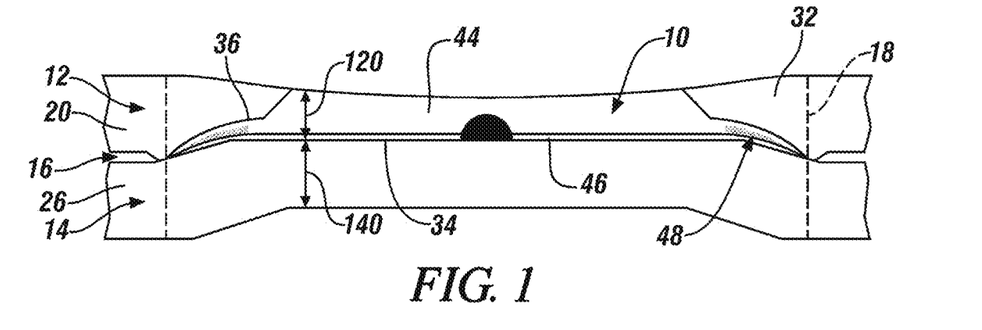
FIG. 1 is a cross-sectional illustration of a weld joint that bonds together an aluminum workpiece (top) and a steel workpiece (bottom) within a weld zone.

Referring now to FIG. 1, the weld joint 10 is shown (in cross-section) that bonds an aluminum workpiece 12 and a steel workpiece 14 together at a faying interface 16 of the two overlapping workpieces 12, 14. The weld joint 10 is encompassed within a weld zone 18 that extends through the aluminum and steel workpieces 12, 14. The cross-sectional size and shape of the weld zone 18 is defined by the perimeter of the weld joint 10 at the bonding interface of the joint 10 and the steel workpiece 14 as depicted in FIG. 1. Within the weld zone 18, the aluminum workpiece 12 has a thickness 120 and, likewise, the steel workpiece 14 has a thickness 140. The thickness 120 of the aluminum workpiece 120 preferably ranges from 0.3 mm to 6.0 mm or, more narrowly, from 0.5 mm to 3.0 mm, and the thickness 140 of the steel workpiece preferably ranges from 0.3 mm to 6.0 mm or, more narrowly, from 0.6 mm to 2.5 mm. The thicknesses 120, 140 of the aluminum and steel workpieces 12, 14 outside of the weld zone 18 may be greater than the thicknesses 120, 140 inside the weld zone 18 due to the impressions left in the workpieces 12, 14 by the weld faces of opposed welding electrodes at the weld zone 18.

In some instances, at least one additional workpiece may be present in addition to the adjacent pair of weld bonded aluminum and steel workpieces 12, 14 shown in FIG. 1. For example, an additional third workpiece (not shown) may be located adjacent to the aluminum workpiece 12 or the steel workpiece 14 opposite the faying interface 16. The additional third workpiece may be composed of either aluminum or steel and is located adjacent to the workpiece 12, 14 of the same base metal composition; that is, an additional aluminum workpiece may be disposed adjacent to the aluminum workpiece 12 to provide an aluminum-aluminum-steel stack-up or an additional steel workpiece may be disposed adjacent to the steel workpiece 14 to provide an aluminum-steel-steel stack-up. In yet another example, two additional workpieces (also not shown) may be present to provide any of an aluminum-aluminum-steel-steel stack-up, an aluminum-aluminum-aluminum-steel stack-up, or an aluminum-steel-steel-steel stack-up. In terms of their composition and thickness, the additional aluminum workpiece and/or steel workpiece, if present, may be the same as or different from its adjacent corresponding aluminum workpiece 12 or steel workpiece 14, which are weld bonded together at their faying interface 16 by the weld joint 10.

The aluminum workpiece 12 includes a base aluminum substrate 20 composed of unalloyed aluminum or an aluminum alloy that includes at least 85 wt % aluminum. Some notable aluminum alloys that may constitute the base aluminum substrate 20 are an aluminum-magnesium alloy, an aluminum-silicon alloy, an aluminum-magnesium-silicon alloy, or an aluminum-zinc alloy. The aluminum workpiece 12 has a faying surface 22 and a back surface 24, as shown best in FIGS. 2-3. Each of the faying surface 22 and the back surface 24 is delineated by the base aluminum substrate 20 or a surface layer overlying the base aluminum substrate 20, although the faying surface 22 is not present within the weld zone 18 since it is consumed during formation of the weld joint 10. The surface layer, if present, may be a native refractory oxide layer that comprises aluminum oxide compounds and possibly other oxide compounds and/or an oxide layer created during exposure of the aluminum substrate 20 to elevated temperatures during manufacturing, e.g., mill scale, or, alternatively, it may be a layer of zinc, tin, or a metal oxide conversion coating comprised of oxides of titanium, zirconium, chromium, or silicon, as described in U.S. Pub. No. 2014/0360986.

The base aluminum substrate 20 may be provided in wrought or cast form. For example, the base aluminum substrate 20 may be composed of a 4xxx, 5xxx, 6xxx, or 7xxx series wrought aluminum alloy sheet layer, extrusion, forging, or other worked article. In another embodiment, the base aluminum substrate 20 may be composed of a 4xx.x, 5xx.x, 6xx.x, or 7xx.x series aluminum alloy casting. Some more specific kinds of aluminum alloys that may constitute the base aluminum substrate 20 include, but are not limited to, AA5754 and AA5182 aluminum-magnesium alloy, AA6111 and AA6022 aluminum-magnesium-silicon alloy, AA7003 and AA7055 aluminum-zinc alloy, and Al-10Si-Mg aluminum die casting alloy. The base aluminum substrate 20 may further be employed in a variety of tempers including annealed (O), strain hardened (H), and solution heat treated (T), if desired. The term "aluminum workpiece" as used herein thus encompasses unalloyed aluminum and a wide variety of aluminum alloys, whether coated or uncoated, in different spot weldable forms including wrought sheet layers, extrusions, etc., as well as castings.

The steel workpiece 14 includes a base steel substrate 26 of any of a wide variety of strengths and grades that is either coated or uncoated. The base steel substrate 26 may be hot-rolled or cold-rolled and may be composed of steel such as mild steel, interstitial-free steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when the steel workpiece 14 includes press-hardened steel (PHS). Preferred compositions of the base steel substrate 26, however, include mild steel, dual phase steel, and boron steel used in the manufacture of press-hardened steel. Those three types of steel have ultimate tensile strengths that, respectively, range from 150 MPa to 350 MPa, from 500 MPa to 1100 MPa, and from 1200 MPa to 1800 MPa. The term "steel workpiece" as used herein thus encompasses a wide variety of coated and uncoated steels.

Figure 2:
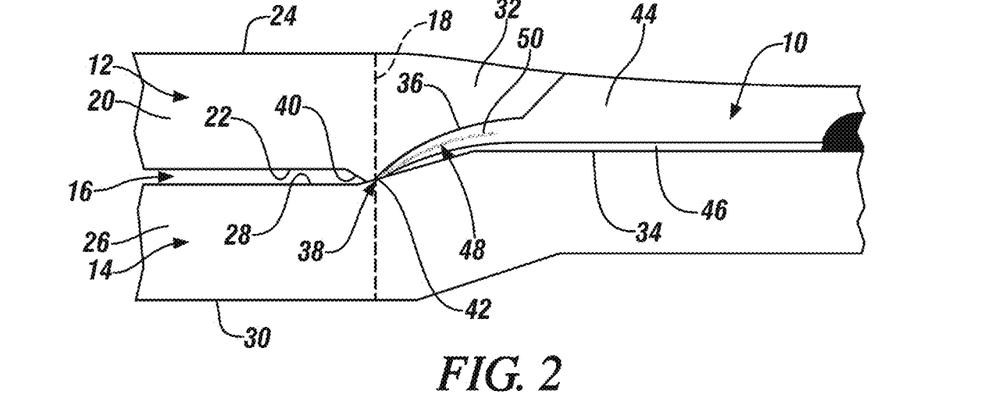
FIG. 2 is a magnified cross-sectional view of the left-hand side of the weld joint shown in FIG. 1 including an embodiment of an annular ring of aluminide particles.
Figure 3:
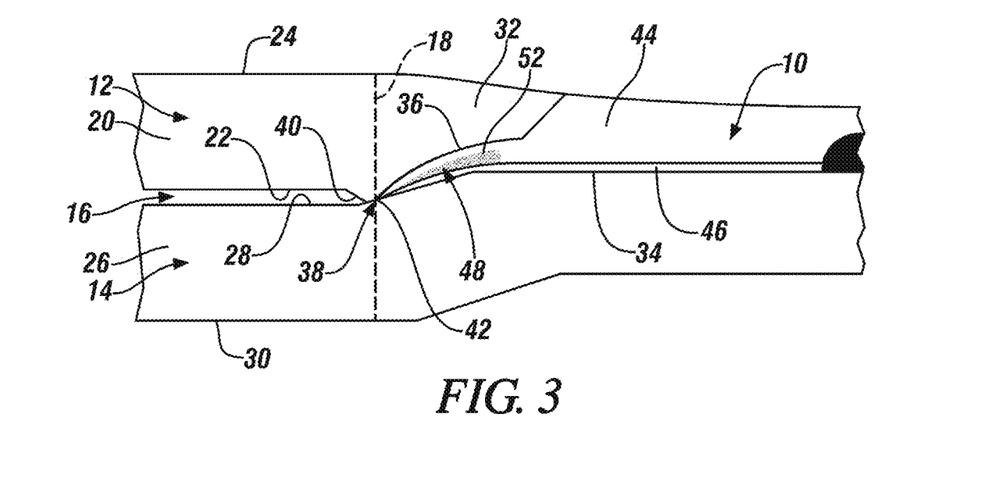
FIG. 3 is a magnified cross-sectional view of the left-hand side of the weld joint shown in FIG. 1 including another embodiment of an annular ring of aluminide particles.
Figure 4:
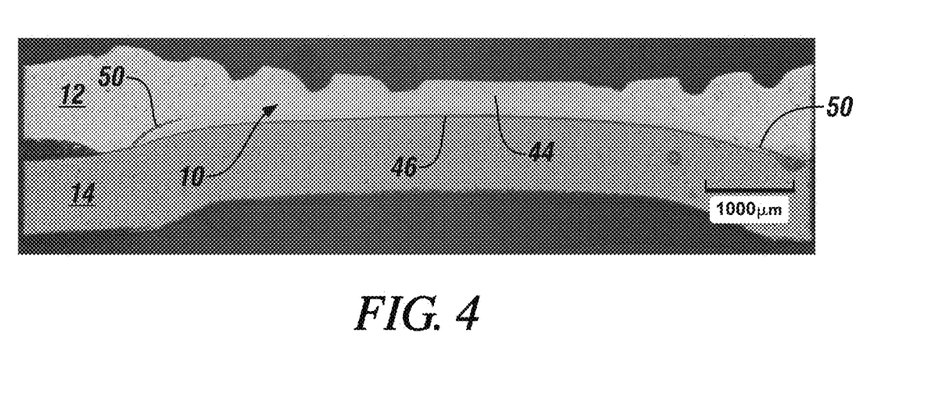
FIG. 4 is a photomicrograph of a section of a weld joint that includes an annular ring of nickel aluminide particles according to one embodiment of the disclosure.
Figure 5:
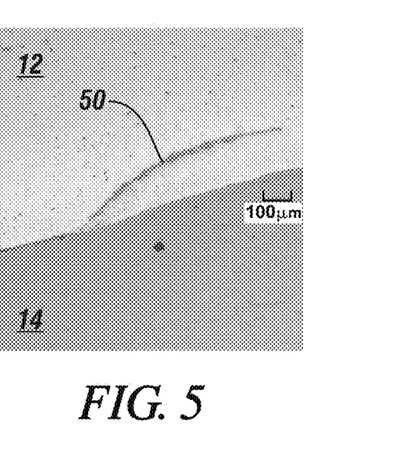
FIG. 5 is a magnified view of the photomicrograph of FIG. 4 that focuses on the left-hand side of the weld joint and the annular ring of nickel aluminide particles.
Figure 6:
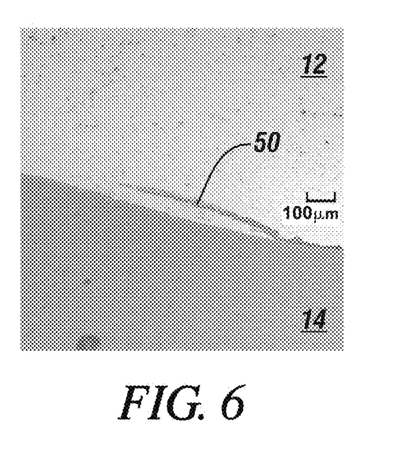
FIG. 6 is a magnified view of the photomicrograph of FIG. 4 that focuses on the right-hand side of the weld joint and the annular ring of nickel aluminide particles.
Figure 7:
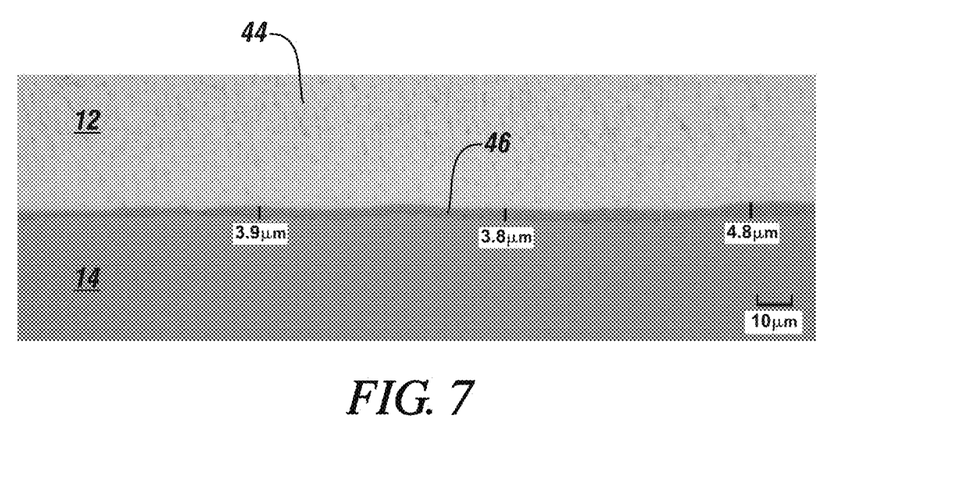
FIG. 7 is a magnified view of the photomicrograph of FIG. 4 that focuses on the center of the weld joint and the intermetallic layer that separates the aluminum weld nugget of the weld joint from the faying surface of the steel workpiece.
Figure 8:
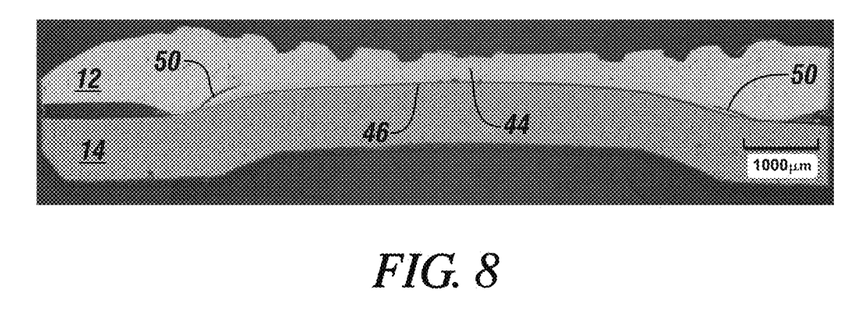
FIG. 8 is a photomicrograph of a section of a weld joint that includes an annular ring of nickel aluminide particles according to one embodiment of the disclosure.
Figure 9:
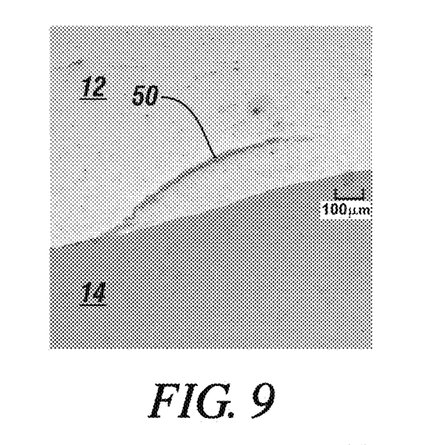
FIG. 9 is a magnified view of the photomicrograph of FIG. 8 that focuses on the left-hand side of the weld joint and the annular ring of nickel aluminide particles.
Figure 10:
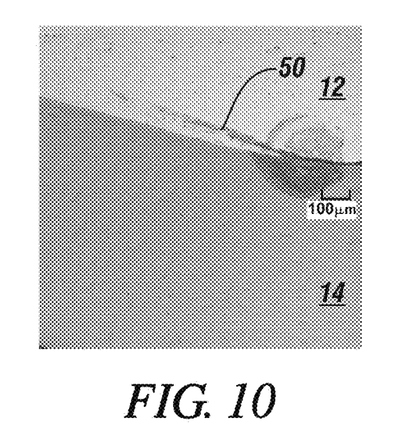
FIG. 10 is a magnified view of the photomicrograph of FIG. 8 that focuses on the right-hand side of the weld joint and the annular ring of nickel aluminide particles.
Figure 11:
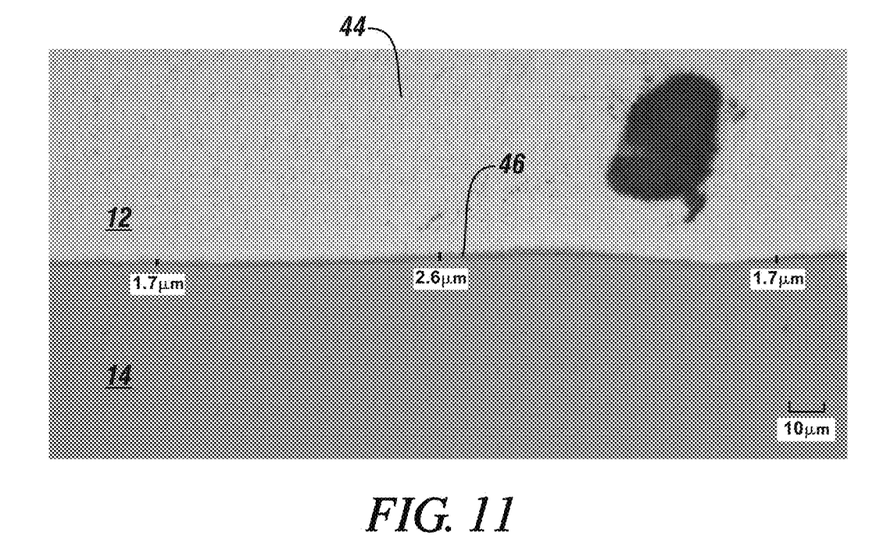
FIG. 11 is a magnified view of the photomicrograph of FIG. 8 that focuses on the center of the weld joint and the intermetallic layer that separates the aluminum weld nugget of the weld joint from the faying surface of the steel workpiece.
Figure 12:
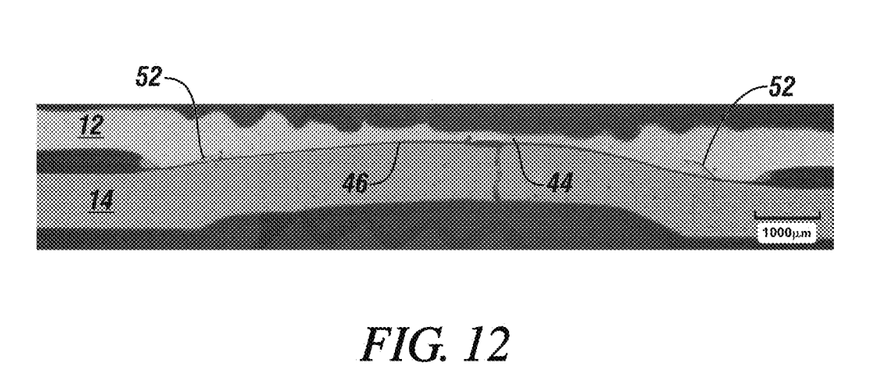
FIG. 12 is a photomicrograph of a section of a weld joint that includes an annular ring of iron aluminide particles according to one embodiment of the disclosure.
Figure 13:
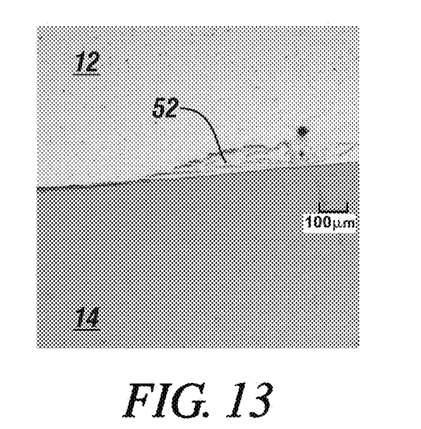
FIG. 13 is a magnified view of the photomicrograph of FIG. 12 that focuses on the left- and side of the weld joint and the annular ring of iron aluminide particles.
Figure 14:
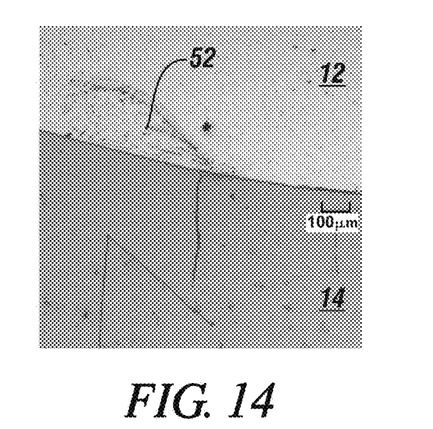
FIG. 14 is a magnified view of the photomicrograph of FIG. 12 that focuses on the right-hand side of the weld joint and the annular ring of iron aluminide particles.
Figure 15:
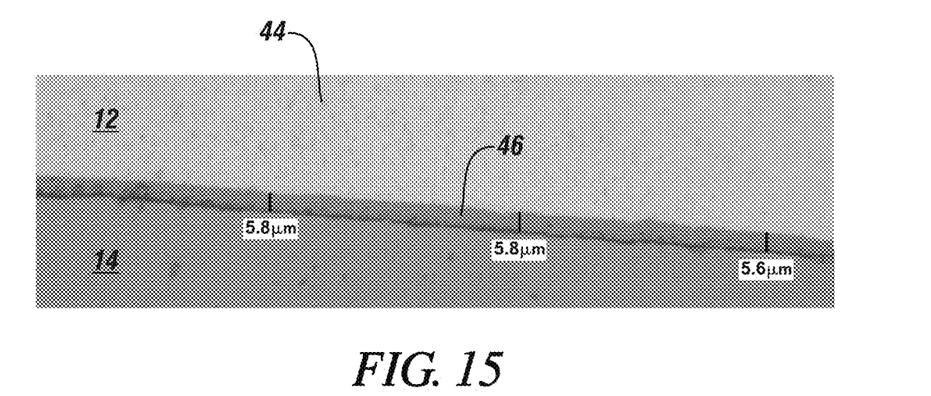
FIG. 15 is a magnified view of the photomicrograph of FIG. 12 that focuses on the center of the weld joint and the intermetallic layer that separates the aluminum weld nugget of the weld joint from the faying surface of the steel workpiece.
Figure 16:
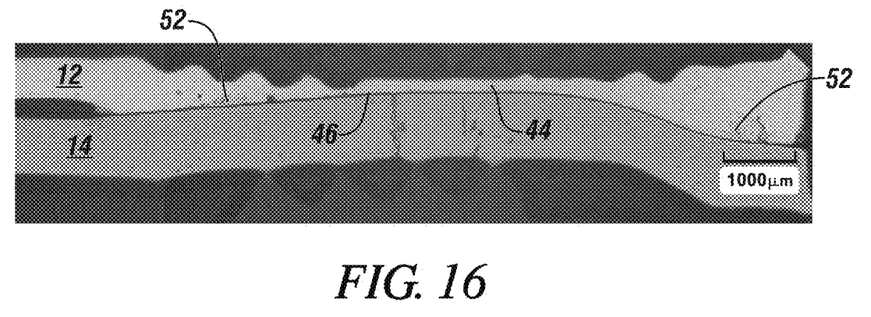
FIG. 16 is a photomicrograph of a section of a weld joint that includes an annular ring of iron aluminide particles according to one embodiment of the disclosure.
Figure 17:
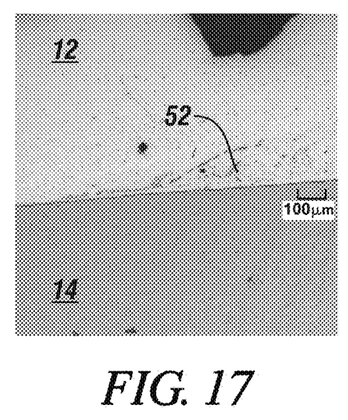
FIG. 17 is a magnified view of the photomicrograph of FIG. 16 that focuses on the left-hand side of the weld joint and the annular ring of iron aluminide particles.
Figure 18:
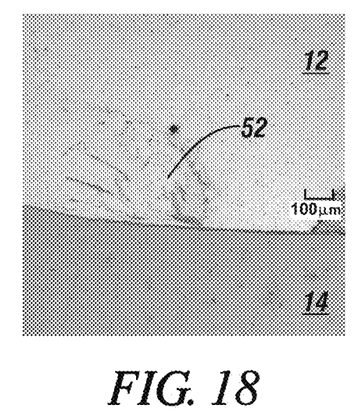
FIG. 18 is a magnified view of the photomicrograph of FIG. 16 that focuses on the right-hand side of the weld joint and the annular ring of iron aluminide particles.
Figure 19:
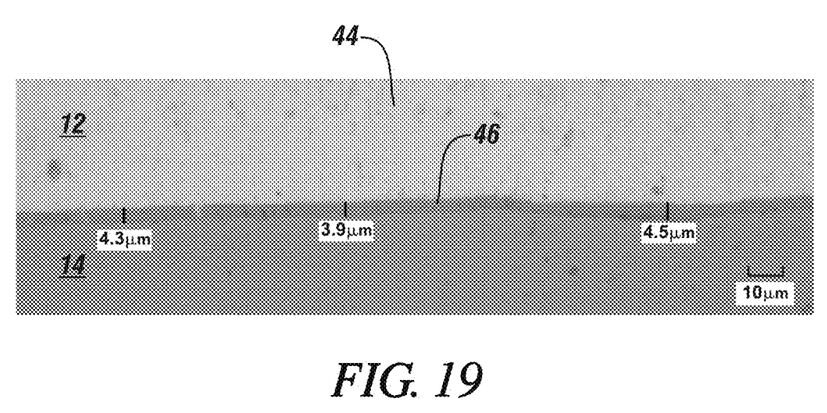
FIG. 19 is a magnified view of the photomicrograph of FIG. 16 that focuses on the center of the weld joint and the intermetallic layer that separates the aluminum weld nugget of the weld joint from the faying surface of the steel workpiece.

The steel workpiece 14 includes a faying surface 28 and a back surface 30, as shown best in FIGS. 2-3. Each of the faying surface 28 and the back surface 30 is delineated by the base steel substrate 26 or a surface layer overlying the base steel substrate 26. The faying surface 28 of the steel workpieces 14 is not consumed by the weld joint 10 like the faying surface 22 of the aluminum workpiece 12 and, thus, it extends through the weld zone 18. The steel workpiece 12, if coated, may include a zinc-based alloy layer comprised of a zinc-nickel alloy layer or a zinc-iron alloy layer (i.e., galvannealed). Such zinc-based alloy layers may include anywhere between 1 wt % and 25 wt % nickel or iron with the majority of the balance being zinc or, more narrowly, anywhere between 5 wt % and 15 wt % nickel or iron with the majority of the balance being zinc. In those instances where the steel workpiece 14 includes a surface layer prior to the formation of the weld joint 10, the surface layer is typically present intact outside of the weld zone 18 since the formation of the weld joint 10 consumes the surface layer on the faying surface 28.

The weld joint 10 is contained within the aluminum workpiece 12 and is surrounded by a heat-affected zone 32. Unlike conventional spot welding practices that join similarly-composed workpieces (e.g., aluminum-to-aluminum and steel-to-steel), the weld joint 10 does not fusion weld the workpieces 12, 14 together. To be sure, the weld joint 10 does not consume and extend through the original location of the faying surface 28 of the steel workpiece 14 within the weld zone and it certainly does not solidify from a molten weld pool of coalesced material that has essentially equal molten material contributions from each of the two workpieces 12, 14. Rather, here, given the relatively significant differences in melting points of the two workpieces 12, 14, the weld joint 10 is obtained by melting and resolidifying a portion of the aluminum workpiece adjacent to the faying surface 28 of the steel workpiece 14. The weld joint 10 thus extends from the faying surface 28 of the steel workpiece 14 towards the back surface 24 of the aluminum workpiece 12 to a penetration depth that ranges from 20% to 100% of the thickness 120 of the aluminum workpiece 12 within the weld zone 18. The planar diameter of the weld joint 10 (i.e., the diameter of the largest section of the weld joint 10 in plan view) depends on the thickness 140 of the steel workpiece 14. In most cases, however, the planar diameter of the weld joint 10 ranges from 4 mm to 16 mm or, more narrowly, from 5 mm to 10 mm.

The weld joint 10 is delineated by a weld bond surface 34 and a workpiece perimeter surface 36. The weld bond surface 34 is adjacent to and bonded with the faying surface 28 of the steel workpiece 14. In a preferred embodiment, the weld bond surface 34 has a surface area that ranges from $4\pi T$ to $20\pi t$, in which the variable "t" is the thickness 140 of the aluminum workpiece 14 within the weld zone 18 prior to formation of the weld joint 10. The workpiece perimeter surface 36 extends away from the weld bond surface 34 in a narrowing fashion and constitutes the boundary of the weld joint 10 within the aluminum workpiece 12. The workpiece perimeter surface 36 separates the weld joint 10 from the surrounding heat-affected zone 32 in the interior of the aluminum workpiece 12 and, in those instances in which the weld joint 10 fully penetrates the aluminum workpiece 12, is coterminous with a portion of a back surface 24 of the aluminum workpiece 12 as illustrated here in FIG. 1.

Located outside of and around the weld joint 10 at the faying interface 16 of the aluminum and steel workpieces 12, 14 is a notch root 38. This is shown best in FIGS. 2-3. The notch root 38 includes a notch root opening 40 and a notch root slit 42. The notch root opening 40 is a gap of limited radial expanse that separates the faying surface 22 of the aluminum workpiece 12 and the faying surface 28 of the steel workpiece 14 outside of the weld zone 18. This gap is formed as a consequence of the high clamping pressure imposed on aligned sections of the back surface 24 of the aluminum workpiece 12 and the back surface 30 of the steel workpiece 14 either directly or indirectly (e.g., through an additional aluminum and/or an additional steel workpiece) by the opposed welding electrodes during formation of the weld joint 10. The notch root slit 42 is located radially inward of the notch root opening 40 and just outside of the weld zone 18 directly adjacent to the weld joint 10. The notch root slit 42 is a non-bonded hydraulically sealed interface between the faying surfaces 22, 28 of the aluminum and steel workpieces 12, 14.

An intermediate organic material layer (not shown) may also be located outside of and around the weld joint 10 between the faying surfaces 22, 28 of the aluminum and steel workpieces 12, 14, although the notch root 38 is typically clear of such material. The intermediate organic material layer may be an adhesive layer that includes a structural thermosetting adhesive matrix. The structural thermosetting adhesive matrix may be any curable structural adhesive including, for example, as a heat-curable epoxy or a heat curable polyurethane. Some specific examples of heat-curable structural adhesives that may be used as the adhesive matrix include DOW Betamate 1486, Henkel Terokal 5089, and Uniseal 2343, all of which are commercially available. Additionally, the adhesive layer may further include optional filler particles, such as silica particles, dispersed throughout the thermosetting adhesive matrix to modify to modify the viscosity profile or other properties of the adhesive for manufacturing operations. In other embodiments, the intermediate organic material layer may be a sealer or a sound-damping material. The intermediate organic material layer preferably has a thickness at the faying interface 16 of 0.1 mm to 2.0 mm or, more narrowly, from 0.2 mm to 1.0 mm.

The weld joint 10 is comprised of three notable compositional components: (1) an aluminum weld nugget 44, (2) an intermetallic layer 46, and (3) an annular ring 48 of aluminide particles. The aluminide particles are preferably selected from the group consisting of nickel aluminide particles, iron aluminide particles, and a combination thereof. These three components 44, 46, 48 of the weld joint 10 are produced when practicing resistance spot welding with a source of diffusible nickel and/or iron at the faying interface 16, as will be explained in greater detail below. The weld joint 10 may include porosity or a void fraction that is centrally located within the joint 10 either at the weld bond surface 34 or away from the weld bond surface 34. Additionally, residual oxide film fragments may be virtually absent at the weld bond surface 34 of the weld joint 10. This combination of centrally located porosity and the absence of fragments of a residual oxide film and/or a composite residue film at the weld bond surface 34 helps contribute to good strength—in particular good peel and cross-tension strength—of the weld joint 10 by providing a clean bonding interface between the weld bond surface 34 of the joint 10 and the adjacent faying surface 28 of the steel workpiece 14, especially around the periphery of the weld joint 10.

The aluminum weld nugget 44 is comprised of resolidified aluminum material, which is derived from a molten weld pool of the aluminum workpiece 12, and constitutes the largest portion of the weld joint 10 on both a volumetric and a weight percent basis. The aluminum weld nugget 44 is separated from the faying surface 28 of the steel workpiece 14 by the intermetallic layer 46 and tapers radially inwardly as it extends away from the weld bond surface 34 of the weld joint 10. The intermetallic layer 46 provides the weld bond surface 34 of the weld joint 10 and is formed by a metallurgical reaction between molten aluminum (formed during welding) and iron from the steel workpiece 14 to produce iron-aluminum (Fe—Al) intermetallic compounds. Indeed, the intermetallic layer 46 may include $FeAl_3$ intermetallic compounds, $Fe_2Al_5$ intermetallic compounds, and possibly other iron-aluminum intermetallic compounds, and typically has a thickness across the weld bond surface 34 that ranges from 1 μm to 5 μm. In terms of their comparative physical and mechanical properties, the intermetallic layer 46 is harder, more brittle, and less tough than the aluminum weld nugget 44.

The annular ring 48 of aluminide particles extends upwards from the weld bond surface 34 either along or inside of the workpiece perimeter surface 36 such that it extends radially inwardly into the aluminum weld nugget 44 from the notch root 38. The aluminide particles contained within the annular ring 48 may be selected from the group consisting of nickel aluminide particles, iron aluminide particles, and a combination thereof. The nickel aluminide particles are particles that are rich in nickel and that further include aluminum and, optionally, other alloying elements such as iron and/or manganese that are present individually at a lower content than nickel. Indeed, some of the nickel in the nickel aluminide particles may be replaced by iron that is dissolved within the molten aluminum weld pool 108. Particles are rich in nickel when they include at least 20 at % nickel such as, for example, between 20 at % and 50 at % nickel. Some examples of nickel aluminide particles that may be found in the annular ring 48 are particles of $NiAl_3$ or NiMnAl. The iron aluminide particles are particles that are rich in iron and that further include aluminum and, optionally, other alloying elements such as nickel and/or manganese that are present individually at a lower content than iron. In some instances, nickel aluminide particles may even convert to iron aluminide particles if enough nickel is replaced by iron that is dissolved in the molten aluminum weld pool 108. Particles are rich in iron when they include at least 20 at % iron such as, for example, between 20 at % and 50 at % iron. Some examples of the iron aluminide particles that may be found in the annular ring 48 are particles of $FeAl_3$, $Fe_2Al_5$, or FeMnAl. Of course, other types of nickel and/or iron aluminide particles may be found in the annular ring 48 in addition to or in lieu of the specific particles listed above.

The aluminide particles that make up the annular ring 48 may be derived from the migration of nickel into the molten aluminum weld pool to form nickel aluminide particles and/or the migration of iron into the molten aluminum weld pool to form iron aluminide particles during formation of the weld joint 10, as will be described in more detail below. In some embodiments, particularly when the aluminide particles are comprised of nickel aluminide particles, the annular ring 48 may constitute a discrete barrier 50, as shown ideally in FIG. 2. In other embodiments, particularly when the aluminide particles are composed of iron aluminide particles, the annular ring 48 may constitute a dispersion band 52, as shown ideally in FIG. 3. The dispersion band 52 is a less dense collection of aluminide particles than the discrete barrier 50 but shares the same basic function.

The annular ring 48 of aluminide particles is believed to enhance the strength—in particular the strength in peel and cross tension—of the weld joint 10 in at least two ways. First, if the aluminum workpiece 12 originally includes a refractory oxide surface layer over its faying surface 22, which is often the case, the process of creating the annular ring 48 of aluminide particles sweeps the fragments of residual oxide film and/or composite residue film that may be present at the faying interface 16 away from the weld bond surface 34. Specifically, the introduction of the aluminide particles into the aluminum weld nugget 44 occurs when the molten aluminum weld pool reacts with nickel and/or iron derived from a source of diffusible nickel and/or iron located at the faying interface 16. A source of diffusible nickel and/or iron refers to any material from which nickel and/or iron can be released into the molten aluminum weld pool to form aluminide particles. To that end, the source of diffusible nickel and/or iron is a material that contains dilute and weakly bound nickel and/or iron that can be easily released from its source for migration into the molten aluminum weld pool. Sources with nickel and/or iron more tightly bound will not release nickel and/or iron into the molten aluminum weld pool while sources with high concentrations of nickel and/or iron are likely to form a contiguous aluminide layer that prematurely terminates nickel and/or iron migration into the weld pool.

The migration of diffusible nickel and/or iron from the source of those metals leads to a congregation of the aluminide particles into the annular ring 48. This migration of the nickel and/or iron into the molten aluminum weld pool—and the concurrent transformation of those migrating metals into aluminide particles—causes residual oxide film fragments and/or composite residue film fragments to be carried away from the faying surface 28 of the steel workpiece 14 and keeps them away from the weld bond surface 34 of the subsequently-formed weld joint 10. Removal of the residual oxide film fragments and/or composite residue film fragments from the weld bond surface 34 is considered to be beneficial, as mentioned above, because near-interface defects of that kind have a tendency to interfere with the integrity of the bond between the weld joint 10 and the faying surface 28 of the steel workpiece 14. The residual oxide film fragments and/or the composite residue film fragments are much more innocuous when located within the bulk of the aluminum weld nugget 44 away from the weld bond surface 34.

Second, the annular ring 48 of aluminide particles, once created, shields the weld bond surface 34 of the weld joint 10 from cracks that may propagate from the notch 38. To be sure, the annular ring 48 of aluminide particles functions as a hard and strong impediment to crack propagation. As such, when a crack originates in the notch root 38 and begins propagating inward into the weld joint 10, the crack is deflected along a non-preferred path into the bulk of the aluminum weld nugget 44. Deflecting crack propagation in this way is less likely to compromise the weld joint 10 since the aluminum weld nugget 44 is softer and tougher than the intermetallic layer 46 situated along the weld bond surface 34 of the weld joint 10. The annular ring 48 of aluminide particles thus protects the portion of the weld joint 10 (i.e., the intermetallic layer 46) that is most susceptible to crack propagation and, consequently, most likely to be the cause of interfacial failure of the weld joint 10 when subjected to loading.

By removing residual oxide film fragments and/or composite residue film fragments from the weld bond surface 34 and shielding the intermetallic layer 46 from cracks that propagate from the surrounding notch root 38, consistently good strength properties can be attained in the weld joint 10. To demonstrate, FIGS. 4-7 and 8-11 show a photomicrograph of a weld joint that includes an annular ring 48 of nickel aluminide particles (as a discrete barrier 50) and FIGS. 12-15 and 16-19 show a photomicrograph of a weld joint that includes an annular ring 48 of iron aluminide particles (as a dispersion band 52). As can be seen, no more than a negligible amount of residual oxide film fragments or a composite residue film fragments, if any, are found at the weld bond surface 34 of the weld joint 10, and the annular ring 48 of aluminide particles extends upwards from the weld bond surface 34 to prevent cracks from having access to the thin intermetallic layer 46. When subjected to loading during standard peel or cross tension tests, these weld joints 10 resulted in button pullout failures (i.e., aluminum workpiece failure), which is a sign of a strong weld joint, as opposed to interfacial failures, which is a sign of a weak weld joint.

The weld joint 10 can be formed by a resistance spot welding method that employs a source of diffusible nickel and/or iron at the faying interface 16 of the aluminum and steel workpieces 12, 14 within the weld zone 18 during current flow. To begin, the aluminum workpiece 12 and the steel workpiece 14 are initially assembled in overlapping fashion by aligning and fixturing the workpieces 12, 14 together such that the faying surface 22 of the aluminum workpiece 12 and the faying surface 28 of the steel workpiece 14 confront one another with or without the presence of an intermediate organic material layer (e.g., an adhesive or sealer) to establish the faying interface 16. Moreover, in one embodiment, the faying surface 28 of the steel workpiece 14 may include the source of diffusible nickel and/or iron in any of a number of suitable forms. In a preferred implementation of this embodiment, the source of diffusible nickel and/or iron is a surface coating of zinc-nickel (source of diffusible nickel) or a surface coating of zinc-iron (source of diffusible iron) that covers the base steel substrate 26 and delineates the faying surface 28 of the steel workpiece 14. In another embodiment, an intermediate organic material layer disposed between the faying surfaces 22, 28 of the aluminum and steel workpieces 12, 14, such as a heat curable adhesive layer, may include the source of diffusible nickel and/or iron in the form of reactive metal alloy particles that include constituent metal elements that can react with molten aluminum to form aluminide particles.

The term "faying interface" is used broadly in the present disclosure and is intended to encompass instances of direct and indirect contact between the faying surfaces 22, 28 of the adjacent aluminum and steel workpieces 12, 14. The faying surfaces 22, 28 are in direct contact with each other when they physically abut and are not separated by a discrete intermediate organic material layer. The faying surfaces 22, 28 are in indirect contact with each other when they are separated by a discrete intermediate organic material layer—and thus do not experience the type of interfacial physical abutment found in direct contact—yet are in close enough proximity to each other that resistance spot welding can still be practiced. Indirect contact between the faying surfaces 22, 28 of the aluminum and steel workpieces 12, 14 typically results when an optional intermediate organic material layer is applied between the faying surfaces 22, 28 prior to spot welding.

Once the aluminum and steel workpieces 12, 14 are assembled in a lapped configuration, a pair of opposed and facially aligned welding electrodes passes electrical current through the aluminum and steel workpieces 12, 14 while applying a clamping force on the workpieces 12, 14. The welding electrodes are preferably water-cooled and constructed of a suitable copper alloy or other electrically and thermally conductive material. The electrical current exchanged between the welding electrodes traverses the faying interface 16 established between the adjacent aluminum and steel workpieces 12, 14. Resistance to the flow of electrical current, which is preferably a DC electrical current having a constant or pulsed current level that ranges from 5 kA to 50 kA and lasts for an overall duration of 50 ms to 2500 ms, quickly heats up the more thermally and electrically resistive steel workpieces 14. The heat generated by the flow of electrical current melts the aluminum workpiece 12 and creates a molten aluminum weld pool within only the aluminum workpiece 12. The molten aluminum weld pool permeates the refractory oxide surface layer of the aluminum workpiece 12, if present, and wets the faying surface 28 of the steel workpiece 14.

During the time that the molten aluminum weld pool wets the faying surface 28 of the steel workpiece 14, the diffusible nickel and/or aluminum reacts with the molten aluminum to form nickel aluminide and/or iron aluminide particles. The formation of the aluminide particles helps disrupt the refractory oxide surface layer at the faying surface 22 of the aluminum workpiece 12, if present. Eventually, the aluminide particles migrate up into the hotter portions of molten aluminum weld pool and are trapped by the low-penetration and narrowing perimeter portion of the weld pool. The aluminum particles can congregate and settle here into the annular ring 48 since they are confined in a low temperature area, and thus subject to less thermal degradation, compared to the center of the molten aluminum weld pool. When migrating up into the molten aluminum weld pool, the aluminide particles may drag residual oxide film fragments and/or composite residue film fragments with them away from the still in-tact faying surface 28 steel workpiece 14. The migration of the aluminide particles can also have a similar affect on sources of porosity to some extent, although the electrical current flow through the workpieces 12, 14 can be managed in a way that drives porosity towards the center of the molten aluminum weld pool according to any of a variety of techniques including, for example, the weld schedule disclosed in U.S. patent application Ser. No. 14/883,249.

The molten aluminum weld pool solidifies into the weld joint 10 that bonds the aluminum and steel workpieces 12, 14 together within the weld zone 18 upon termination of the flow of electrical current between the welding electrodes. The aluminide particles are fixed into the annular ring 48 at this time and, consequently, the residual oxide film fragments and/or the composite residue film fragments carried away by the aluminide particles are trapped within the bulk of the aluminum weld nugget 44 away from the weld bond surface 34 of the weld joint 10. After the flow of current between the welding electrodes has terminated and the molten aluminum weld pool has solidified, the welding electrodes are retracted and the clamping force applied against the aluminum and steel workpieces 12, 14 by the set of welding electrodes is relieved. One or both of the back surfaces 24, 30 of the aluminum and steel workpieces 12, 14 may be left with a contact patch indention (shown in each surface 24, 30 in FIG. 1) as a result of the forcible pressed contact imposed by the welding electrodes. Variations of the described method are of course possible including, but not limited to, the structure and composition of the source of diffusible nickel and/or iron that is disposed at the faying interface 16.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A weld joint that weld bonds together an aluminum workpiece and a steel workpiece and is formed by resistance spot welding, each of the aluminum workpiece and the steel workpiece comprising a faying surface that confronts the faying surface of the other workpiece, and, wherein, during spot welding, a pair of welding electrodes applies a clamping force on the workpieces and passes an electrical current through the workpieces to form the weld joint and an annular notch root disposed between the faying surfaces and surrounding the weld joint, the notch root comprising a notch root opening and a notch root slit, the notch root opening being a gap that separates the faying surfaces of the aluminum workpiece and the steel workpiece, and the notch root slit being a non-bonded interface between the aluminum and steel workpieces located radially inward of the notch root opening and directly adjacent to the weld joint, the weld joint comprising:

an aluminum weld nugget comprised of resolidified aluminum contained within the aluminum workpiece;

an intermetallic layer separating the aluminum weld nugget and the faying surface of the steel workpiece, the intermetallic layer comprising iron-aluminum intermetallic compounds that are formed by a metallurgical reaction during spot welding and providing a weld bond surface of the weld joint that is adjacent to and bonded with the faying surface of the steel workpiece; and an annular ring of aluminide particles that extends upwards from the weld bond surface of the weld joint and radially inwardly into the aluminum weld nugget from the notch root to shield the intermetallic layer so that cracks propagating into the weld joint from the notch root are deflected into the aluminum weld nugget, wherein the annular ring of aluminide particles comprises at least one of nickel aluminide particles that are introduced into the weld joint during spot welding from a diffusible source of nickel or iron aluminide particles that are introduced into the weld joint during spot welding from a diffusible source of iron.

2. The weld joint set forth in claim 1, wherein the annular ring of aluminide particles comprises nickel aluminide particles and iron aluminide particles.

3. The weld joint set forth in claim 1, wherein the annular ring of aluminide particles comprises at least one of nickel aluminide particles having 20 at % to 50 at % nickel or iron aluminide particles having 20 at % to 50 at % iron.

4. The weld joint set forth in claim 3, wherein the annular ring of aluminide particles comprises at least one of $NiAl_3$ particles, NiMnAl particles, $FeAl_3$ particles, $Fe_2Al_5$ particles, or FeMnAl particles.

5. The weld joint set forth in claim 1, wherein the aluminum weld nugget of the weld joint tapers radially inwardly as the aluminum weld nugget extends away from the weld bond surface of the weld joint.

6. The weld joint set forth in claim 1, wherein the weld bond surface has a surface area that ranges from $4\pi t$ to $20\pi t$, in which "t" is a thickness of the aluminum workpiece within a weld zone that contains the weld joint prior to formation of the weld joint.

7. The weld joint set forth in claim 1, wherein the intermetallic layer has a thickness across the weld bond surface that ranges from 1 µm to 5 µm.

8. A weld joint that bonds an aluminum workpiece and a steel workpiece together and is formed by resistance spot welding, each of the aluminum workpiece and the steel workpiece comprising a faying surface that confronts the faying surface of the other workpiece, and, wherein, during spot welding, a pair of welding electrodes applies a clamping force on the workpieces and passes an electrical current through the workpieces to form the weld joint and an annular notch root disposed between the faying surfaces and surrounding the weld joint, the weld joint having a weld bond surface adjacent to and bonded with the faying surface of the steel workpiece, and the notch root comprising a notch root opening and a notch root slit, the notch root opening being a gap that separates the faying surfaces of the aluminum workpiece and the steel workpiece, and the notch root slit being a non-bonded interface between the aluminum and steel workpieces located radially inward of the notch root opening and directly adjacent to the weld joint, the weld joint comprising:

an aluminum weld nugget contained within the aluminum workpiece, the aluminum weld nugget being comprised of resolidified aluminum and tapering radially inward as the aluminum weld nugget extends away from the weld bond surface of the weld joint;

an intermetallic layer separating the aluminum weld nugget and the faying surface of the steel workpiece, the intermetallic layer comprising iron-aluminum intermetallic compounds that are formed by a metallurgical reaction during spot welding and providing the weld bond surface of the weld joint; and an annular ring of aluminide particles that extends upwards from the weld bond surface of the weld joint and radially inwardly into the aluminum weld nugget from the notch root such that the annular ring of aluminide particles shields the intermetallic layer so that cracks propagating into the weld joint from the notch root are deflected into the aluminum weld nugget, wherein the annular ring of aluminide particles comprises at least one of nickel aluminide particles that are introduced into the weld joint during spot welding from a diffusible source of nickel or iron aluminide particles that are introduced into the weld joint during spot welding from a diffusible source of iron.

9. The weld joint set forth in claim 8, wherein the annular ring of aluminide particles comprises at least one of nickel aluminide particles having 20 at % to 50 at % nickel or iron aluminide particles having 20 at % to 50 at % iron.

10. The weld joint set forth in claim 8, wherein the aluminum workpiece includes a base aluminum substrate composed of an aluminum alloy that includes at least 85 wt % aluminum.

11. The weld joint set forth in claim 8, wherein the annular ring of aluminide particles comprises at least one of $NiAl_3$ particles, NiMnAl particles, $FeAl_3$ particles, $Fe_2Al_5$ particles, or FeMnAl particles.

12. The weld joint set forth in claim 8, wherein the intermetallic layer has a thickness across the weld bond surface that ranges from 1 μm to 5 μm.

13. The weld joint set forth in claim 8, wherein the weld bond surface has a surface area that ranges from $4\pi t$ to $20\pi t$, in which "t" is a thickness of the aluminum workpiece within a weld zone that contains the weld joint prior to formation of the weld joint.

* * * * *